United States Patent
Bui et al.

(10) Patent No.: US 8,395,860 B2
(45) Date of Patent: *Mar. 12, 2013

(54) METHOD AND APPARATUS TO POSITION A HEAD MODULE COMPRISING SERVO ELEMENTS AND PLURALITY OF DATA ELEMENTS

(75) Inventors: Nhan X. Bui, Tucson, AZ (US); Giovanni Cherubini, Rueschlikon (SZ); Robert A. Hutchins, Tucson, AZ (US); Jens Jelitto, Rueschlikon (SZ); Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,614

(22) Filed: Apr. 30, 2012

(65) Prior Publication Data
US 2012/0212853 A1    Aug. 23, 2012

Related U.S. Application Data

(63) Continuation of application No. 12/505,435, filed on Jul. 17, 2009, now Pat. No. 8,169,736.

(51) Int. Cl.
*G11B 5/584* (2006.01)
*G11B 21/02* (2006.01)
*G11B 15/46* (2006.01)

(52) U.S. Cl. .................... 360/77.12; 360/75; 360/73.04

(58) Field of Classification Search .................. None
See application file for complete search history.

(56) References Cited

U.S. PATENT DOCUMENTS

| | | |
|---|---|---|
| 5,090,002 A | 2/1992 | Chow et al. |
| 6,587,303 B1 | 7/2003 | Bui et al. |
| 6,940,683 B2 | 9/2005 | Berman et al. |
| 7,023,634 B2 | 4/2006 | Takeo |
| 7,245,450 B1 | 7/2007 | Cherubini et al. |
| 7,280,307 B2 | 10/2007 | Bui et al. |
| 7,365,929 B2 | 4/2008 | Cherubini et al. |
| 8,169,736 B2 * | 5/2012 | Bui et al. .................... 360/77.12 |
| 2005/0174681 A1 | 8/2005 | Berman et al. |
| 2006/0126215 A1 | 6/2006 | Bui et al. |
| 2007/0171565 A1 | 7/2007 | Cherubini et al. |
| 2008/0024904 A1 | 1/2008 | Cherubini et al. |
| 2009/0073604 A1 | 3/2009 | Johnson et al. |

FOREIGN PATENT DOCUMENTS

| | | |
|---|---|---|
| JP | 04368676 | 12/1992 |
| WO | WO2007085529 | 8/2007 |

* cited by examiner

*Primary Examiner* — Andrew L Sniezek
(74) *Attorney, Agent, or Firm* — Dale F. Regelman; Quarles & Brady LLP

(57) ABSTRACT

A method to position a head module, where the head module comprises at least one servo element and a plurality of data elements, where the servo element and each of the plurality of data elements can detect a servo signal, wherein the method includes moving a sequential information storage medium having a servo band encoded therein across the head module and detecting the servo band using the at least one servo element or any one of the plurality of data elements.

12 Claims, 13 Drawing Sheets

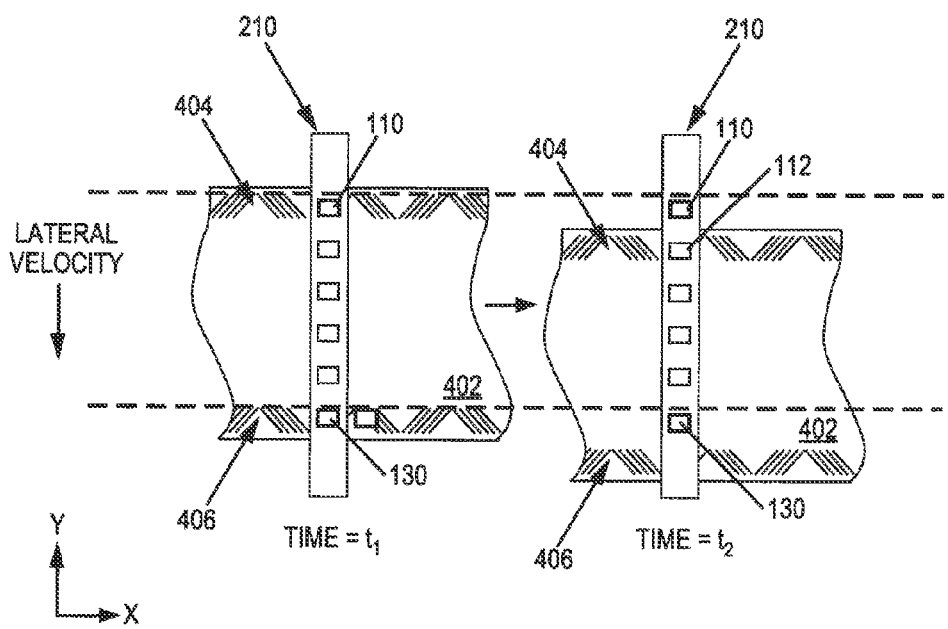
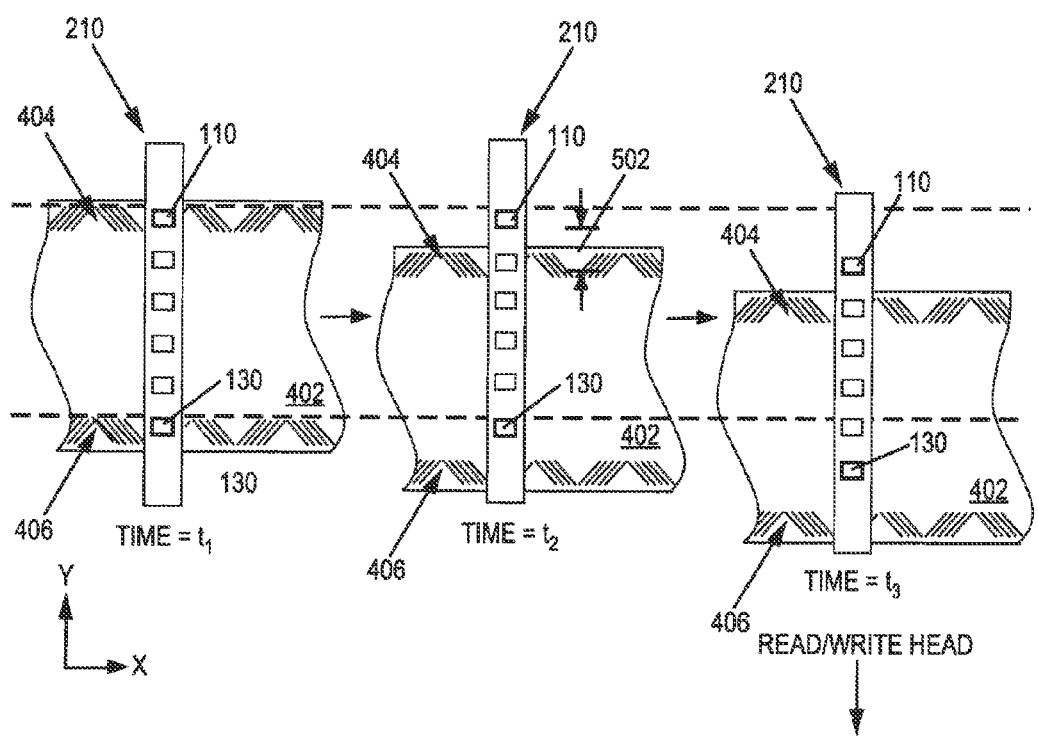

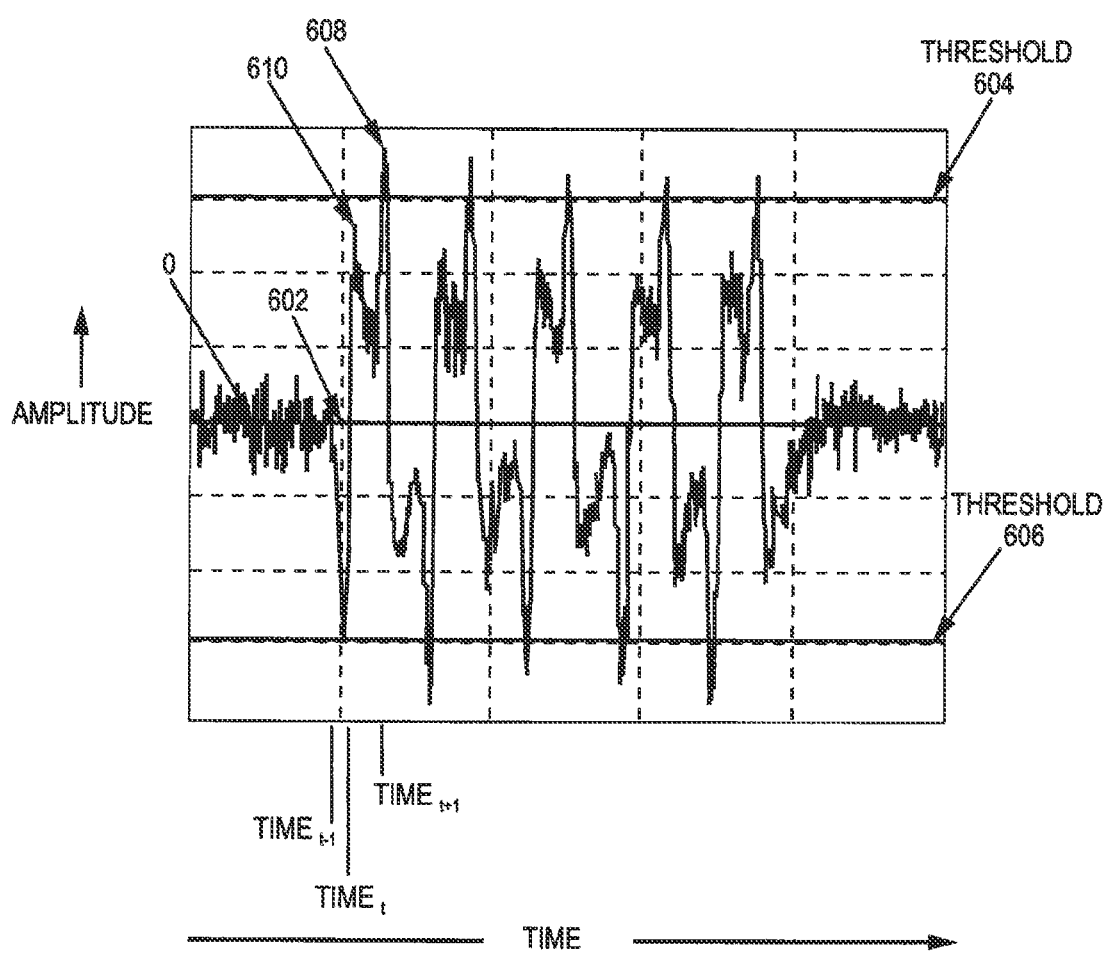

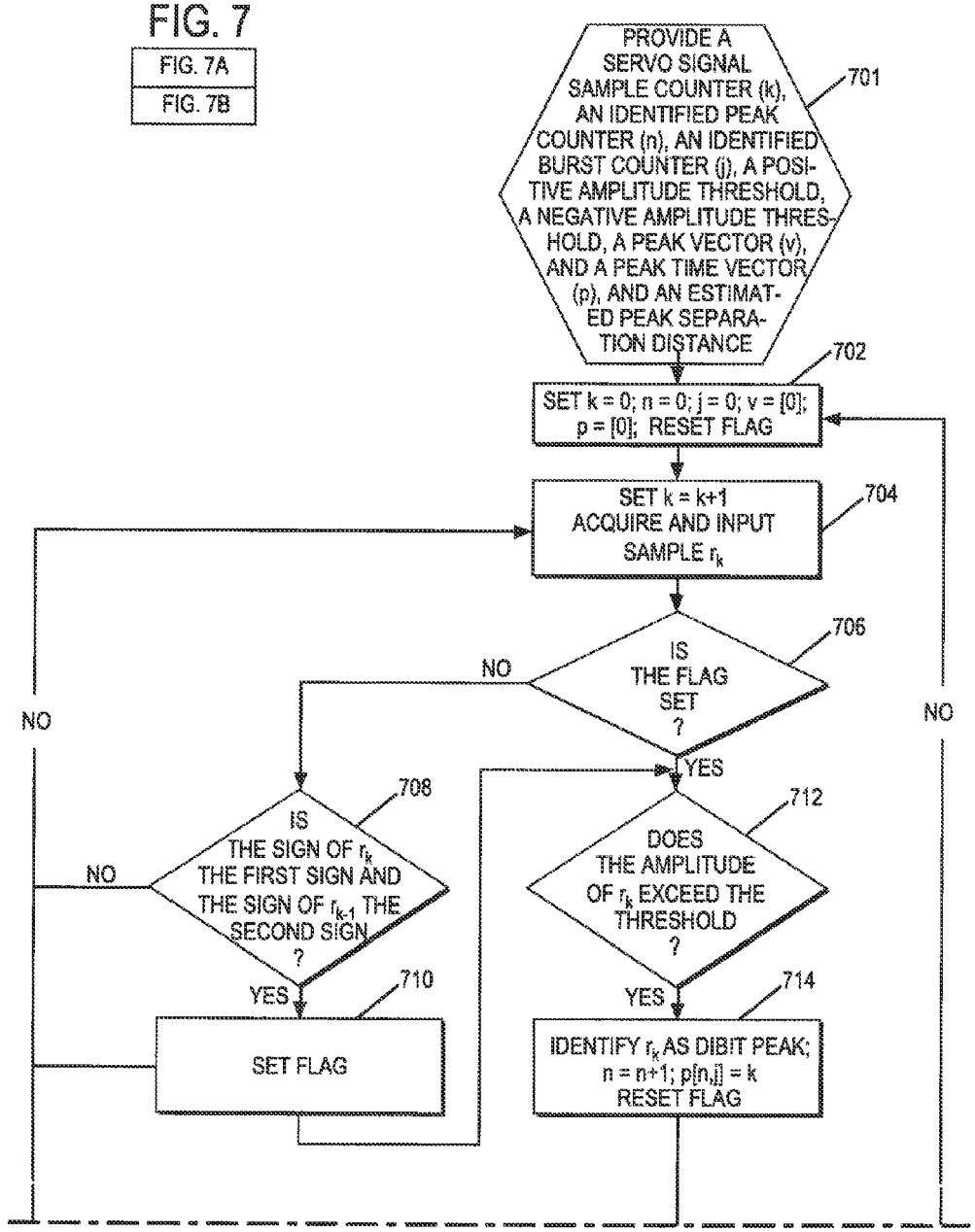

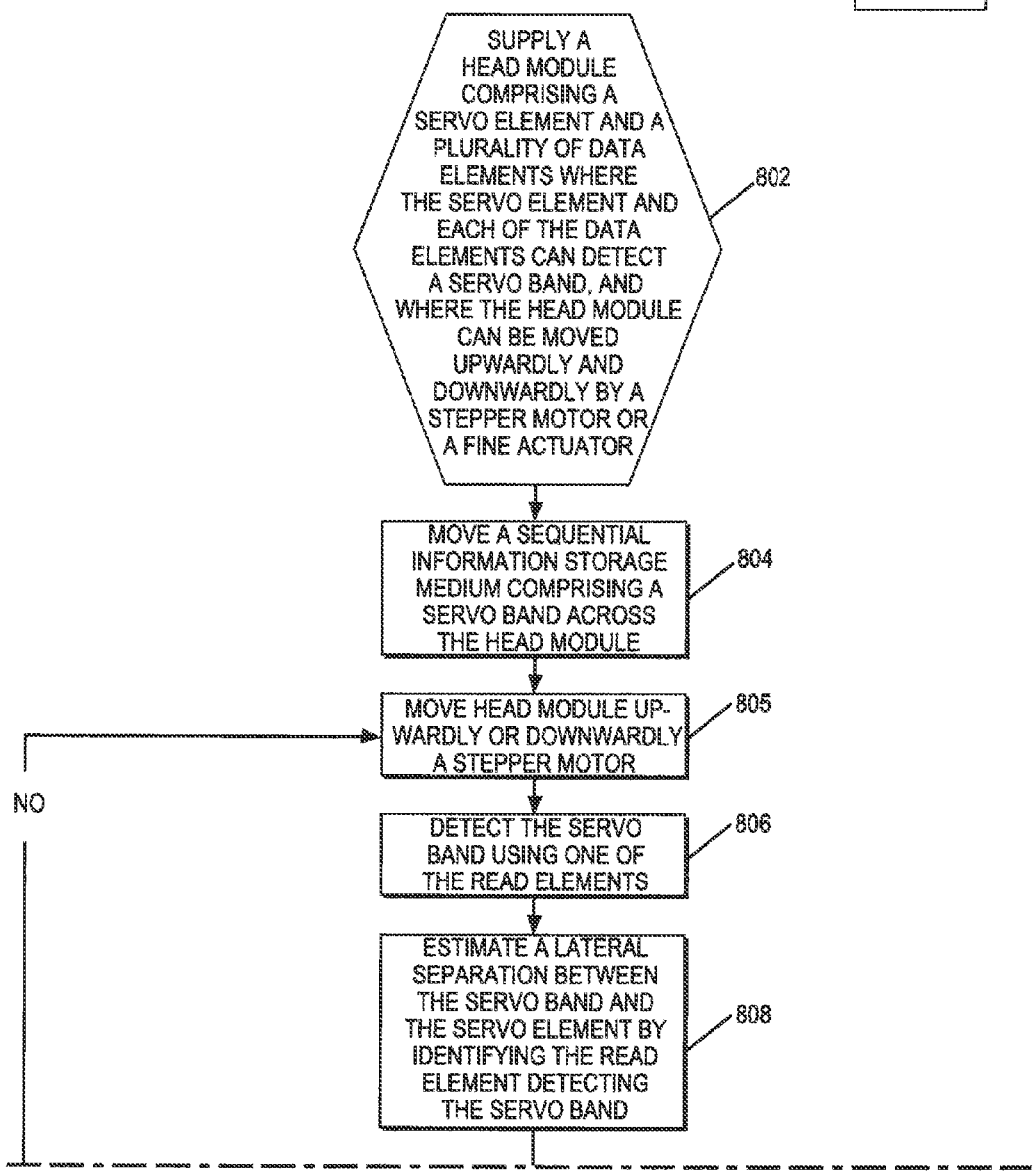

METHOD AND APPARATUS TO POSITION A HEAD MODULE COMPRISING SERVO ELEMENTS AND PLURALITY OF DATA ELEMENTS

CROSS-REFERENCE TO RELATED APPLICATIONS

This Application is a Continuation Application claiming priority to the application having Ser. No. 12/505,435 filed Jul. 17, 2009, which is hereby incorporated by referenced herein.

FIELD OF THE INVENTION

The present invention relates generally to data storage devices, and more particularly to detecting a servo band encoded in a sequential information storage medium using data elements disposed on a head module.

BACKGROUND OF THE INVENTION

Many data storage devices move a sequential information storage medium, such as for example a magnetic tape, across a head module comprising multiple data elements in combination with two or more servo elements. To write and read data to and from the storage medium, it is necessary that the head module be precisely positioned with respect to data tracks encoded in the storage medium. The demand for greater data storage densities has forced a reduction in size of the individual data tracks. Furthermore, the storage medium itself is subject to lateral movement as it is being moved across a head module. Thus, the position of the head module must continuously be adjusted.

Using prior art apparatus and methods, servo elements are used to detect servo bands encoded in a sequential information storage medium. Data elements are used to write data to, and/or read data from, a sequential information storage medium. Such prior art data elements are not capable of reliably detecting servo patterns encoded in a servo band.

SUMMARY OF THE INVENTION

It is necessary to rapidly identify servo bands encoded in a sequential information storage medium, to determine a lateral position of a head module with respect to the identified servo bands, and to move that head module as needed.

In one implementation, a method is presented to position a head module, wherein the head module comprises at least one servo element in combination with a plurality of data elements, wherein each of the plurality of data elements can detect servo bands encoded in a sequential information storage medium. The method includes moving the sequential information storage medium across the head module and detecting a servo band using any one of the plurality of data elements.

In another implementation, an article of manufacture is presented, where that article of manufacture comprises a computer readable medium comprising computer readable program code to position a head module, wherein the head module comprises at least one servo element in combination with a plurality of data elements, wherein each of the plurality of data elements can detect servo bands encoded in a sequential information storage medium. The computer readable program code includes a series of computer readable program steps to effect moving the sequential information storage medium across the head module and detecting a servo band using at least one servo element or any of the plurality of data elements.

In another implementation, a computer program product encoded in a computer readable medium and useable with a programmable computer processor is presented to position a head module, wherein the head module comprises at least one servo element in combination with a plurality of data elements, wherein each of the plurality of data elements can detect servo bands encoded in a sequential information storage medium. The computer program product comprises computer readable program code which causes said programmable processor to move the sequential information storage medium across the head module and to detect a servo band using at least one servo element or any of the plurality of data elements.

BRIEF DESCRIPTION OF THE DRAWINGS

Implementations of the invention will become more apparent from the detailed description set forth below when taken in conjunction with the drawings, in which like elements bear like reference numerals.

FIG. 4 is a block diagram depicting Applicants' head module disposed adjacent a moving sequential information storage medium having a lateral velocity;

FIG. 5 illustrates positioning Applicants' head module with respect to the moving sequential information storage medium;

FIG. 6 is a graph showing measured amplitudes of a servo burst as observed by a data element over time;

FIG. 7A is a flowchart summarizing Applicants' method to detect servo bands and estimate certain servo-channel parameters;

FIG. 8A is a flowchart summarizing Applicants' method to use the methods of FIGS. 7A and 7B to rapidly position a head module;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
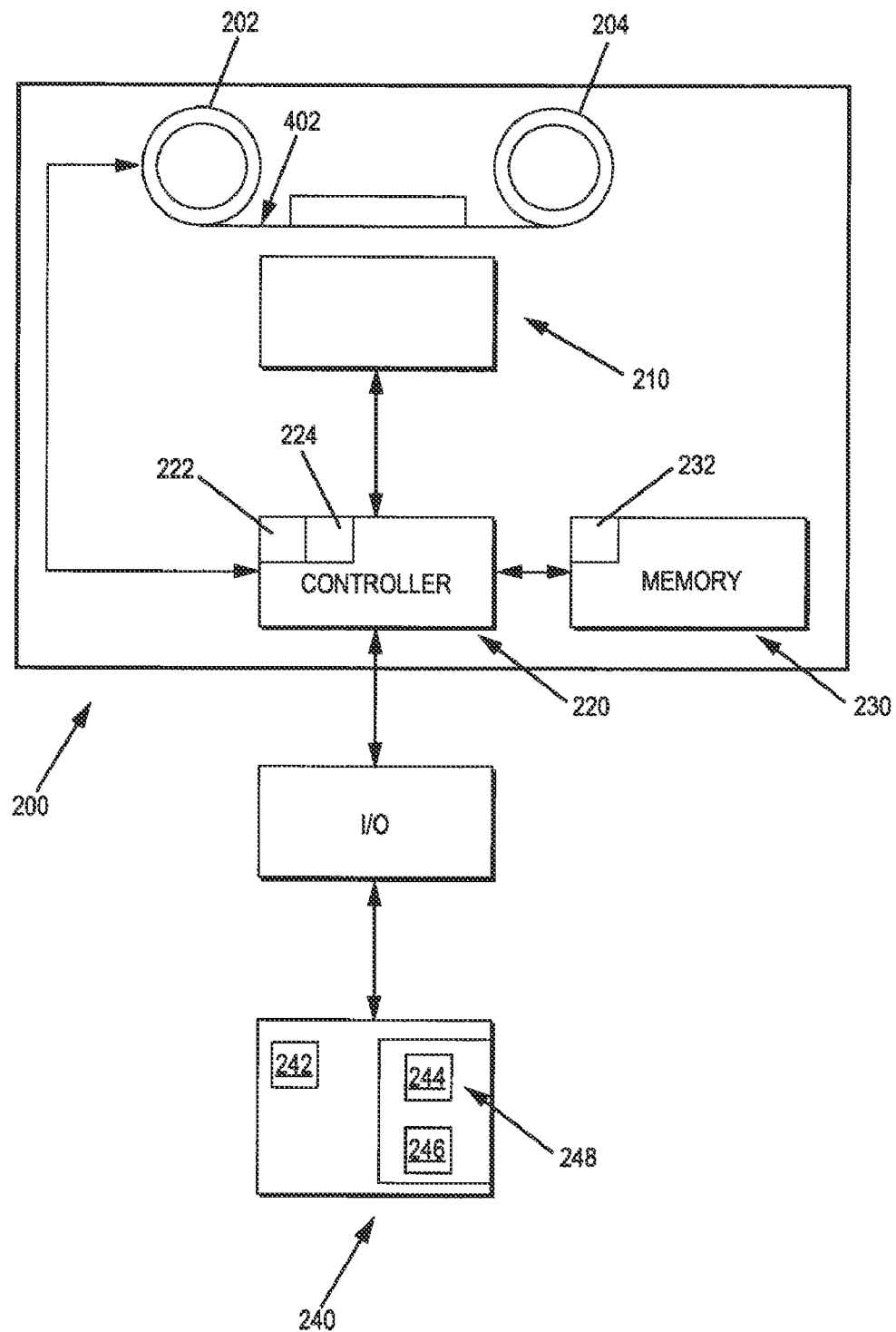
FIG. 2 is a block diagram illustrating one embodiment of Applicants' data storage device.

Referring now to FIG. 2, when writing data to or reading data from a sequential information storage medium 402 (FIGS. 4 and 5), such as a magnetic tape, a portion of the medium is disposed on a first rotatable reel, such as reel 202, and a portion of the medium is disposed on a second rotatable reel, such as reel 204. The rotatable reels are moved such that sequential information storage medium 402 is moved from one reel, across head module 210, and onto the other reel.

In the illustrated embodiment of FIG. 2, head module 210 is in communication with controller 220. In certain embodiments, controller 220 is integral with head module 210. Further in the illustrated embodiment of FIG. 2, controller comprises processor 222 and data buffer 224. Controller 220 is in communication with computer readable medium 230. Instructions 232 are encoded in computer readable medium 230.

In certain embodiments, computer readable medium 230 is integral with controller 220. In the illustrated embodiment of FIG. 2, reel 202, reel 204, head module 210, controller 220, and computer readable medium 230 are disposed within a data storage device apparatus 200. As those skilled in the art will appreciate, data storage device 200 may comprise other elements and components not shown in FIG. 2.

In the illustrated embodiment of FIG. 2, data storage device 200 is in communication with host computer 240. Host computer 240 comprises a computing system, such as a mainframe, personal computer, workstation, and combinations thereof, including an operating system such as Windows, AIX, Unix, MVS, LINUX, etc. In certain embodiments, host computer 240 further includes a storage management program 244 encoded in a computer readable medium 248. In certain embodiments, that storage management program may include the functionality of storage management type programs known in the art that manage the transfer of data to and from a data storage device, such as data storage device 200. In the illustrated embodiment of FIG. 2, host computer 240 further comprises a processor 242 and instructions 246 encoded in computer readable medium 248.

Figure 1:
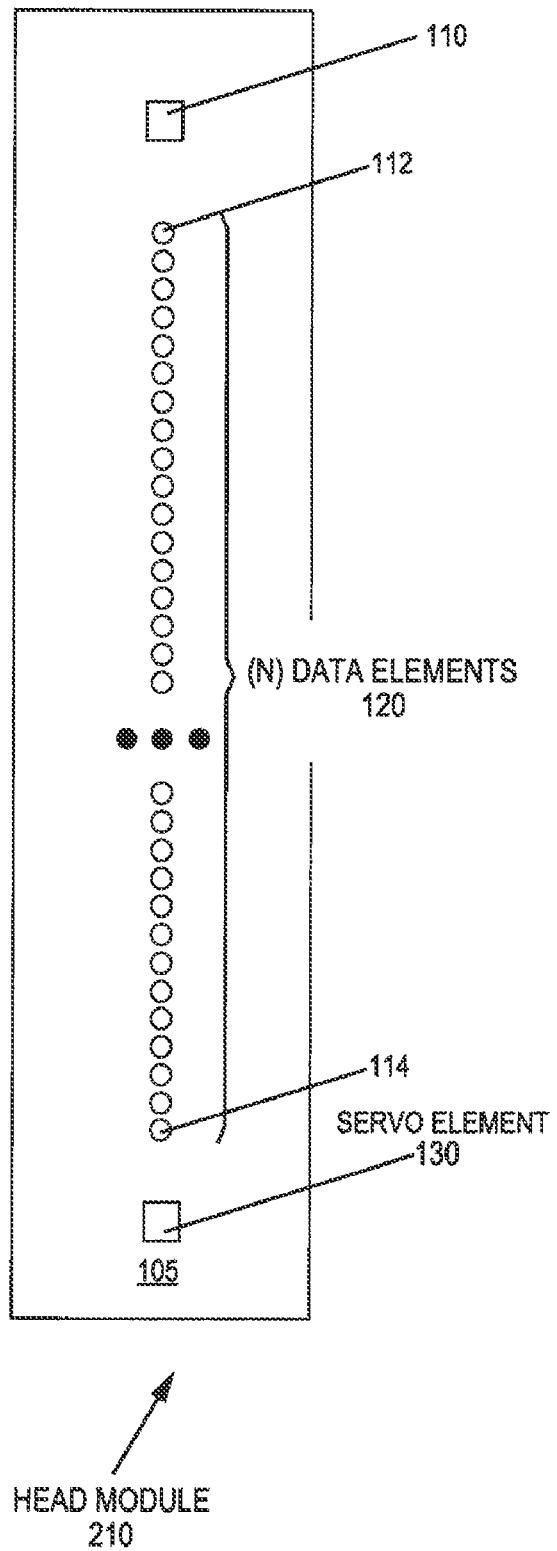
FIG. 1 illustrates one embodiment of Applicants' head module.
Figure 9:
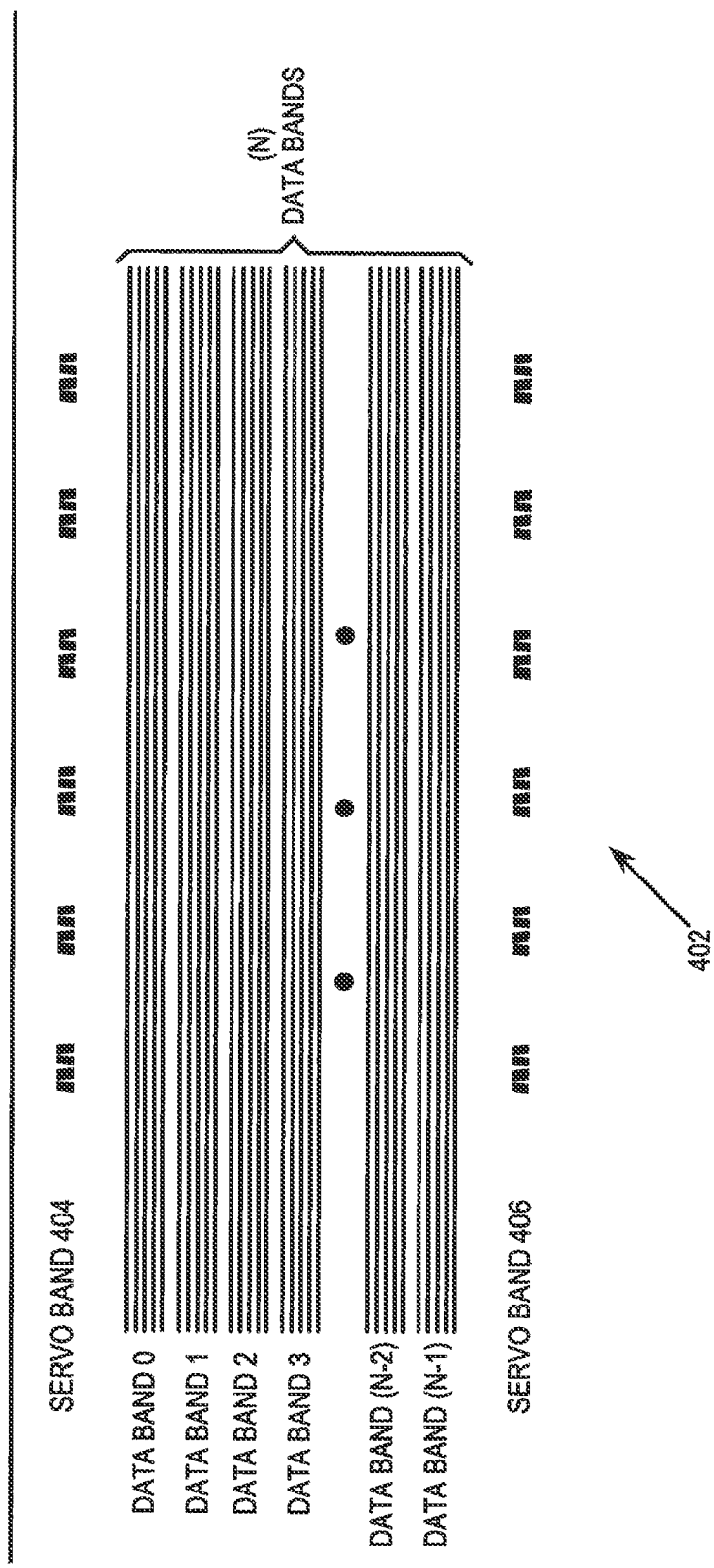
FIG. 9 illustrates one embodiment of a tape architecture comprising a plurality of data tracks and two servo bands.

FIG. 1 illustrates surface 105 of head module 210 (FIGS. 1, 2), wherein surface 105 faces sequential information storage medium 402 (FIGS. 2, 9). In the illustrated embodiment of FIG. 1, surface 105 comprises (N) data elements 120 disposed between servo elements 110 and 130.

In sequential information storage media, such as for example magnetic storage media, servo frames are encoded in non-data portions of the medium. Those servo frames are used to position a head module with respect to a plurality of data tracks, to provide sync data, to provide manufacturer data, and to determine longitudinal position ("LPOS") along the length of the medium.

Referring now to FIGS. 1 and 9, servo elements 110 and 130 detect servo frames disposed in servo bands 404 and 406, respectively. Each of the (N) data elements 120 reads signals from a different one of (N) data bands written to sequential information storage medium 402. In addition, each of the (N) data elements 120 can detect servo frames encoded in servo band 404 or servo band 406.

Figure 3:
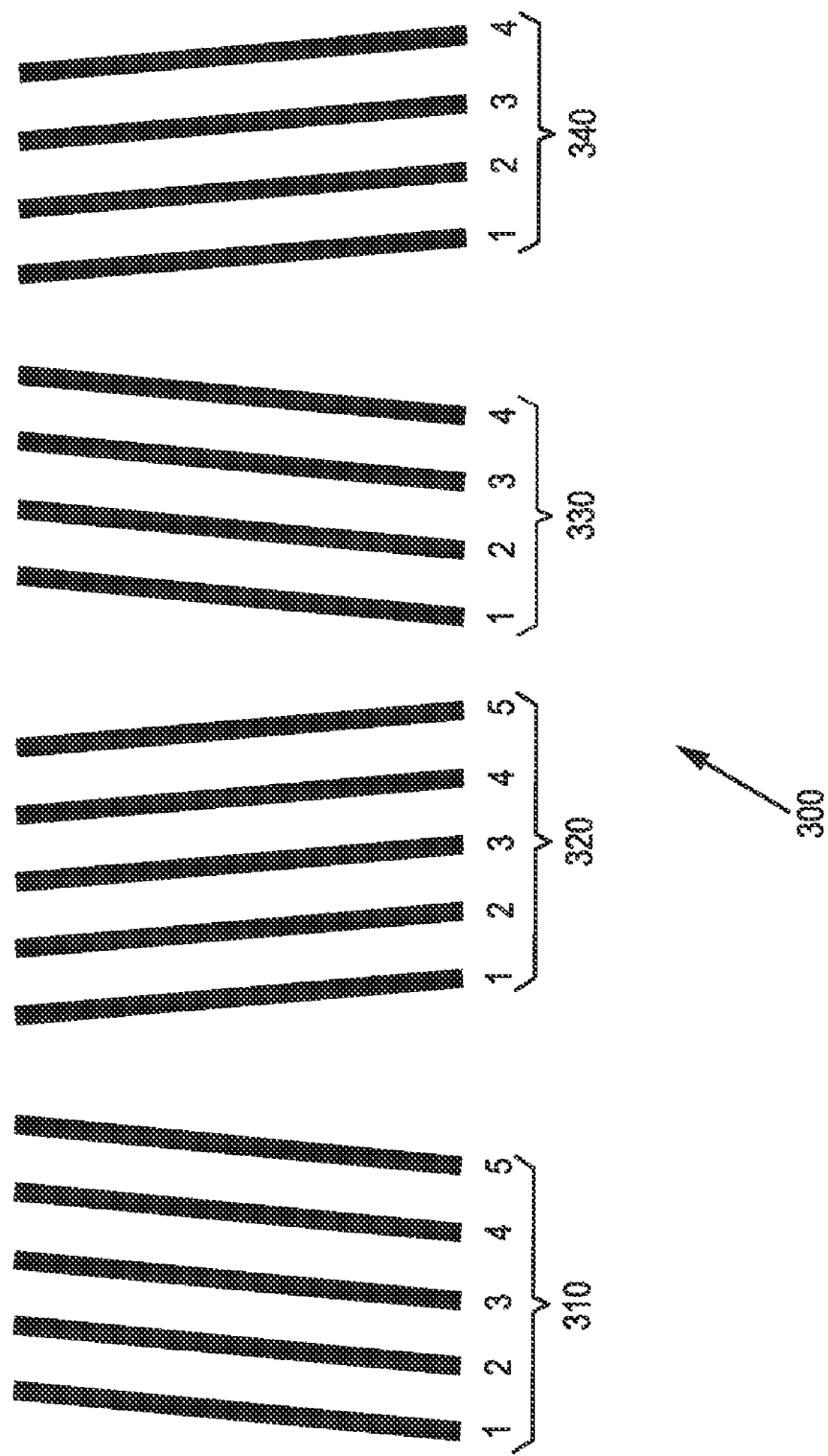
FIG. 3 shows a servo frame comprising four bursts, wherein each of those four bursts comprises a plurality of stripes.
Figure 11:
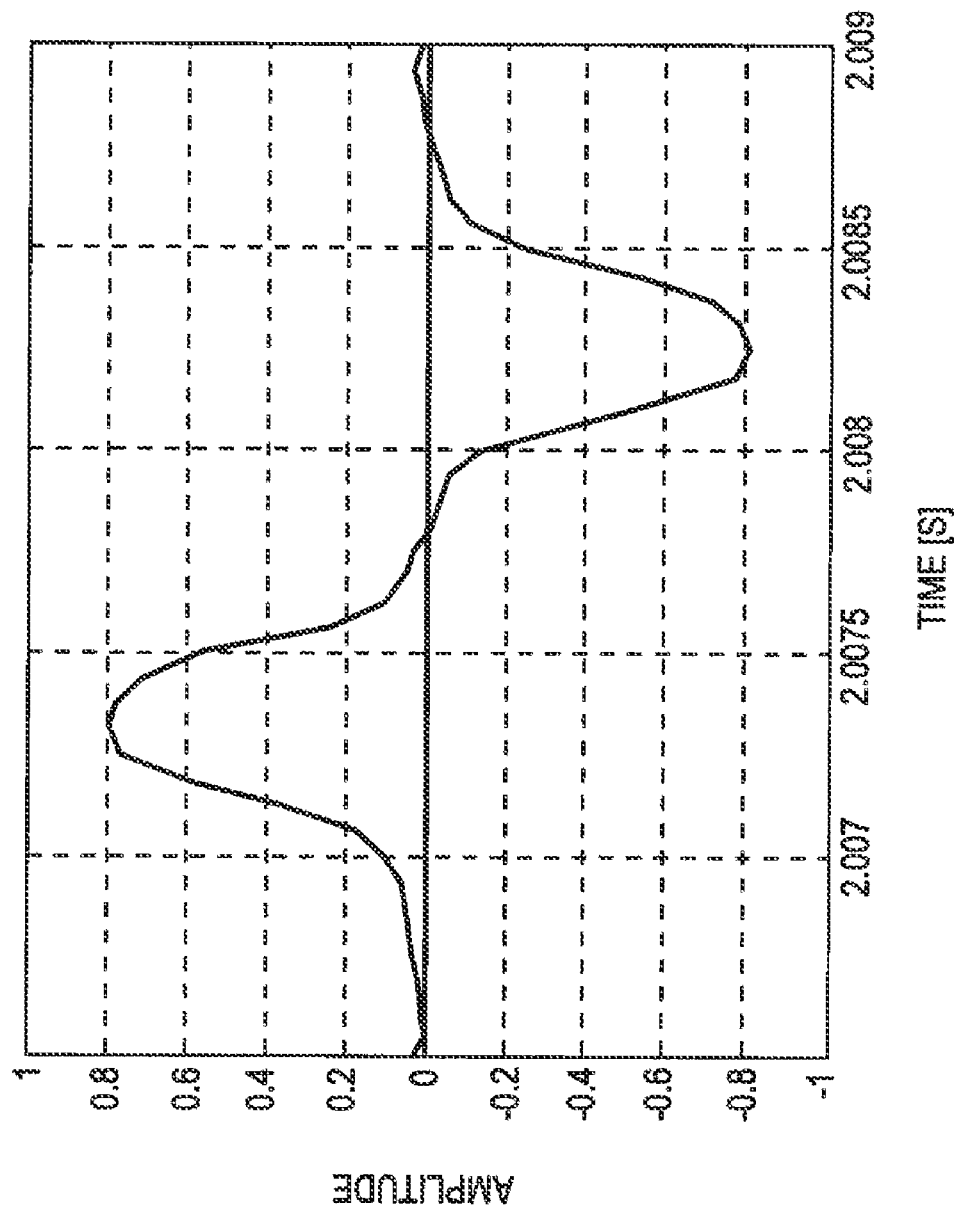
FIG. 11 is a graph showing measured amplitudes of a dibit as observed by a servo element over time.
Figure 12:
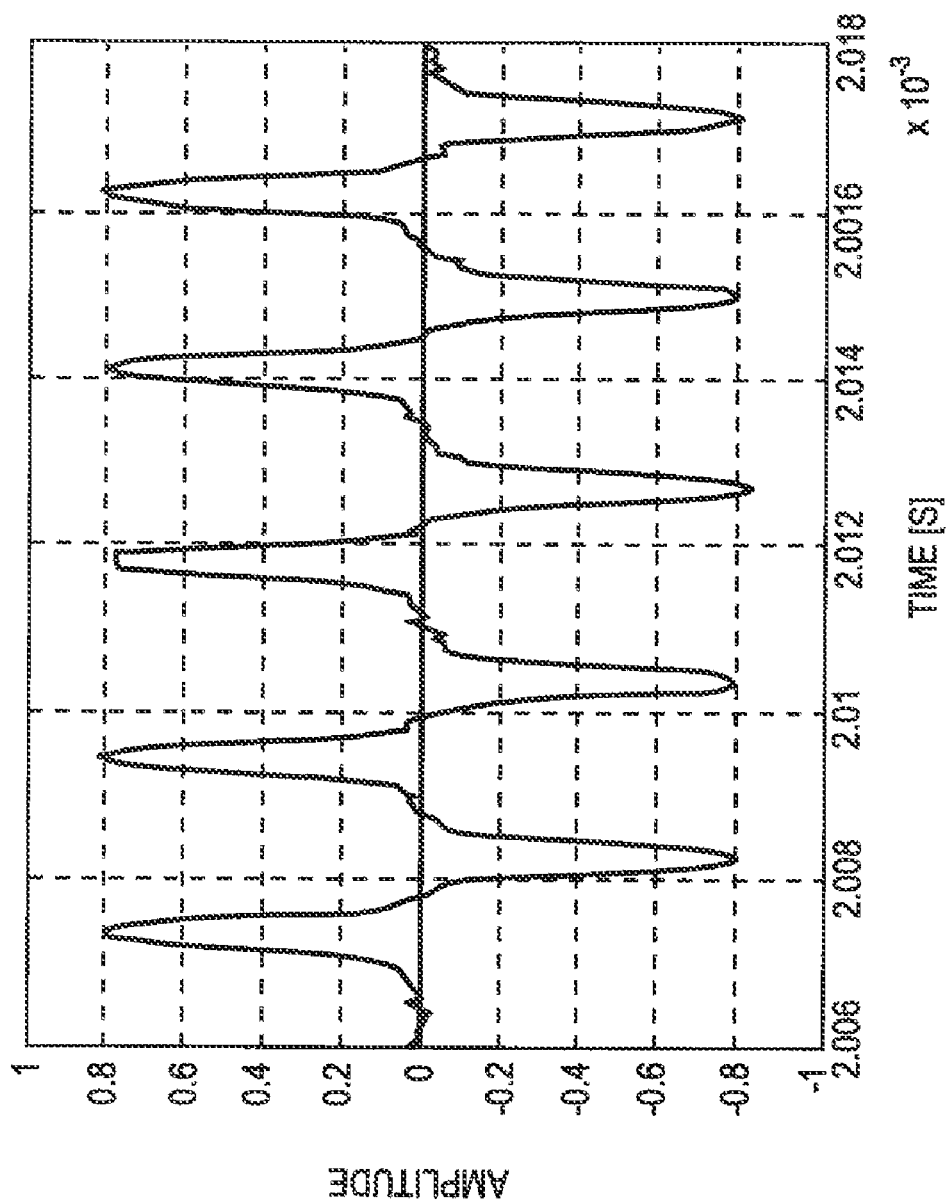
FIG. 12 is a graph showing measured amplitudes of a servo burst as observed by a servo element over time.

Referring to FIG. 3, servo frame 300 comprises a plurality of magnetic transitions each comprising one of two different azimuthal slopes. A pair of magnetic transitions at the minimum transition distance is sometimes referred to as "stripe". Reading a stripe by a servo element gives origin to a signal that is referred to as "pulse" or "dibit", as shown in FIG. 11. Reading a sequence of stripes, as found in a servo pattern, by a servo element gives origin to a sequence of dibits that is referred to as "burst", as shown in FIG. 12.

Head module lateral position is derived from the relative timing of pulses generated by reading servo frame 300. Servo frame 300 also allows the encoding of longitudinal positioning ("LPOS") information without affecting the generation of the transversal position error signal ("PES").

Figure 10:
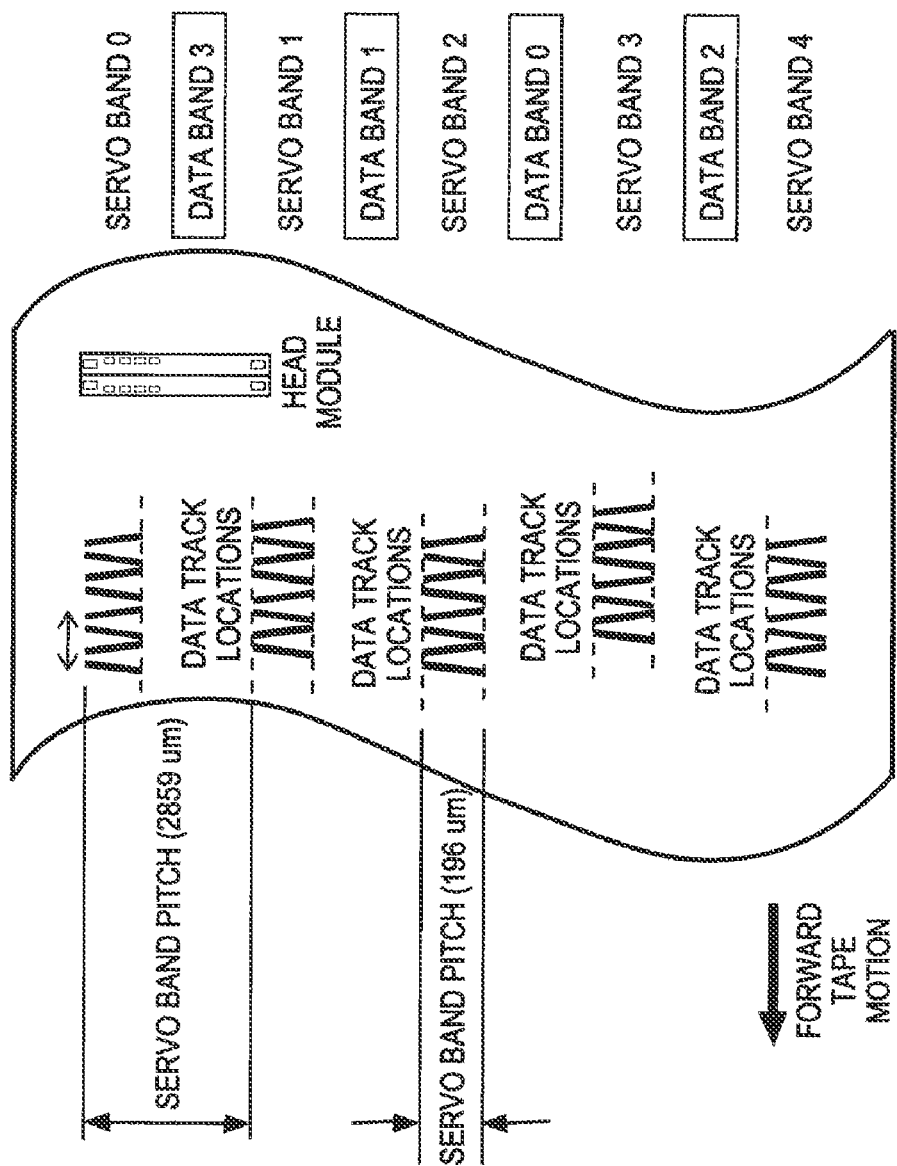
FIG. 10 is a diagram illustrating the placement of servo frames in five servo bands, as specified in the linear tape-open (LTO) format.

LPOS information is encoded by shifting transitions from the nominal positions as shown in FIG. 3. FIG. 10 illustrates the placement of servo frames in five servo bands, as specified in the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. In tape systems there are typically available two dedicated servo channels from which LPOS information as well as PES can be derived. The relative position of servo frames in two adjacent servo bands in the longitudinal direction is defined by the LTO standard. The LTO standard specifies a relative displacement of 33.33 or 66.66 $\mu$m, with a tolerance of +/−4.16 $\mu$m.

Servo frame 300 comprises a first burst 310 comprising five stripes, wherein each of those five stripes comprises a first azimuthal slope. Servo frame 300 further comprises a second burst 320 comprising five stripes, wherein each of those five stripes comprises a second azimuthal slope. Servo frame 300 further comprises a third burst 330 comprising four stripes, wherein each of those four stripes comprises the first azimuthal slope. Servo frame 300 further comprises a fourth burst 340 comprising four stripes, wherein each of those four stripes comprises the second azimuthal slope.

Before data can be written to or read from a sequential information storage medium, such as sequential information storage medium 402 (FIGS. 2, 4, 5, 9), head module 210 must be precisely positioned with respect to the storage medium such that an appropriate read head is positioned over an associated data track. To do this, it is necessary to locate servo bands, and to estimate certain servo-channel parameters (e.g., storage medium velocity and head module transversal (y)-position).

Initial servo signal acquisition from storage medium 402 is normally performed using a sequence of analog-to-digital converter (ADC) output signal samples from servo elements without any prior knowledge of channel parameters. As the sampling frequency of the servo systems ADC is fixed, typically in the range from 15 MHz to 24 MHz, several samples per dibit of a servo burst will be obtained when the velocity of the sequential information storage medium is low, but only a few samples per dibit will be obtained when the velocity is high. As no timing information is available when the servo signal acquisition is started, Applicants' method relies on detection of the servo signal peaks generated by reading servo bursts.

A peak is typically considered identified if an absolute value of a servo signal sample exceeds a threshold value. Because of the fixed sampling frequency, if the velocity of the sequential information storage medium is low, several consecutive signals generated when detecting a single dibit may exceed the threshold value, thereby complicating peak identification. On the other hand, if the storage medium velocity is high, none of the samples acquired may exceed the threshold value.

Furthermore, during an acquisition phase almost no knowledge regarding servo signal quality (i.e., asymmetry, baseline shift, amplitude, saturation, signal-to-noise ratio (SNR)) is available. When signal distortion is significant, further difficulties in reliably identifying servo signal peak values are encountered.

Additional difficulties can be encountered in positioning a head module such that the servo elements are positioned over the servo bands encoded in the sequential information storage medium. Typically, the initial positioning of the servo elements is achieved by moving the head module upwardly or downwardly at a low head module velocity, using a stepper motor, until a servo element detects a servo band.

This procedure is likely to eventually succeed. Nevertheless, such an acquisition process is slow. Moreover during such an acquisition process, no data can be read from, or written to, the sequential information storage medium. Further, even if the acquisition procedure does succeed, the head module will likely need to be repositioned periodically to position the head module over a different data band, or to compensate for sudden lateral movement of the sequential information storage medium relative to the head module due, e.g., to shock events, which the track-following servomechanism cannot properly follow.

FIG. 4 graphically illustrates the changed relative position of head module 210 relative to sequential information storage medium 402 as sequential information storage medium 402 moves along both the X and Y axes. In the illustrated embodiment of FIG. 4, at time $t_1$ head module 210 is positioned such that servo elements 110 and 130 detect servo bands 404 and 406, respectively. If, as depicted, the lateral velocity of sequential information storage medium 402 is nonzero, by time $t_2$ sequential information storage medium 402 may have shifted laterally such that servo elements 110 and 130 cannot detect servo bands 404 and 406 unless head module 210 is repositioned.

However, positioning head module 210 such that servo elements 110 and 130 can detect servo bands 404 and 406 is a moving-target problem.

FIG. 5 illustrates this problem. At time $t_1$, head module 210 is positioned such that servo elements 110 and 130 can detect servo bands 404 and 406, respectively. At $t_2$ wherein time $t_2$ is later than time $t_1$, sequential information storage medium 402 has shifted by distance 502 in the y-direction. As head module 210 is moved downwardly by distance 502, sequential information storage medium 402 continues to shift downwardly as well. For example in the illustrated embodiment of FIG. 5 at time $t_3$, wherein time $t_3$ is later than time $t_2$, head module is still not positioned such that servo elements 110 and 130 can detect servo bands 404 and 406, respectively.

Applicants' invention comprises a method of rapidly positioning the servo elements using servo or data elements enabled with servo pattern detection capabilities.

Furthermore, Applicants' invention comprises a method for blind acquisition of servo-channel parameter estimates (i.e., storage medium velocity and y-position of a head module) based on the detection of servo frames, wherein that method is highly robust against servo signal distortions such as signal asymmetry, baseline shifts, amplitude variations, waveform saturation, and low SNR. Specifically, Applicants' method operates independently on either or, or both, positive and negative dibit peaks of a plurality of servo signals, and is based on the identification, within a servo frame, of servo signals consisting of sequences of [4, 4, 5, 5] peaks having the same sign.

FIG. 6 graphically depicts the amplitude of a servo signal detected over a time interval of one servo burst by Applicants' data element. Note that a dibit must be detected by a data element in the presence of considerably higher distortion than in the case of detection by a servo element, see FIGS. 11 and 12, because of the mismatch in the front-end electronics between the servo and data elements. A zero crossing occurs when the amplitude of the signal goes to zero, indicated by line 602. By using a fixed sampling frequency, an acquired sample may not actually comprise a value of zero. However, determining if the sign of a monitored servo signal changes, that sign change indicates that a zero crossing has occurred.

By way of example and not limitation, sample $r_{k-1}$ was obtained at time t−1 and comprises a negative amplitude. Sample $r_k$ was taken at time t and comprises a positive amplitude. The change in the sign of the servo signal amplitude indicates that a zero crossing has occurred. Furthermore, if this was the first zero crossing observed, then Applicants' method will monitor positive dibit peaks.

Figure 7B:
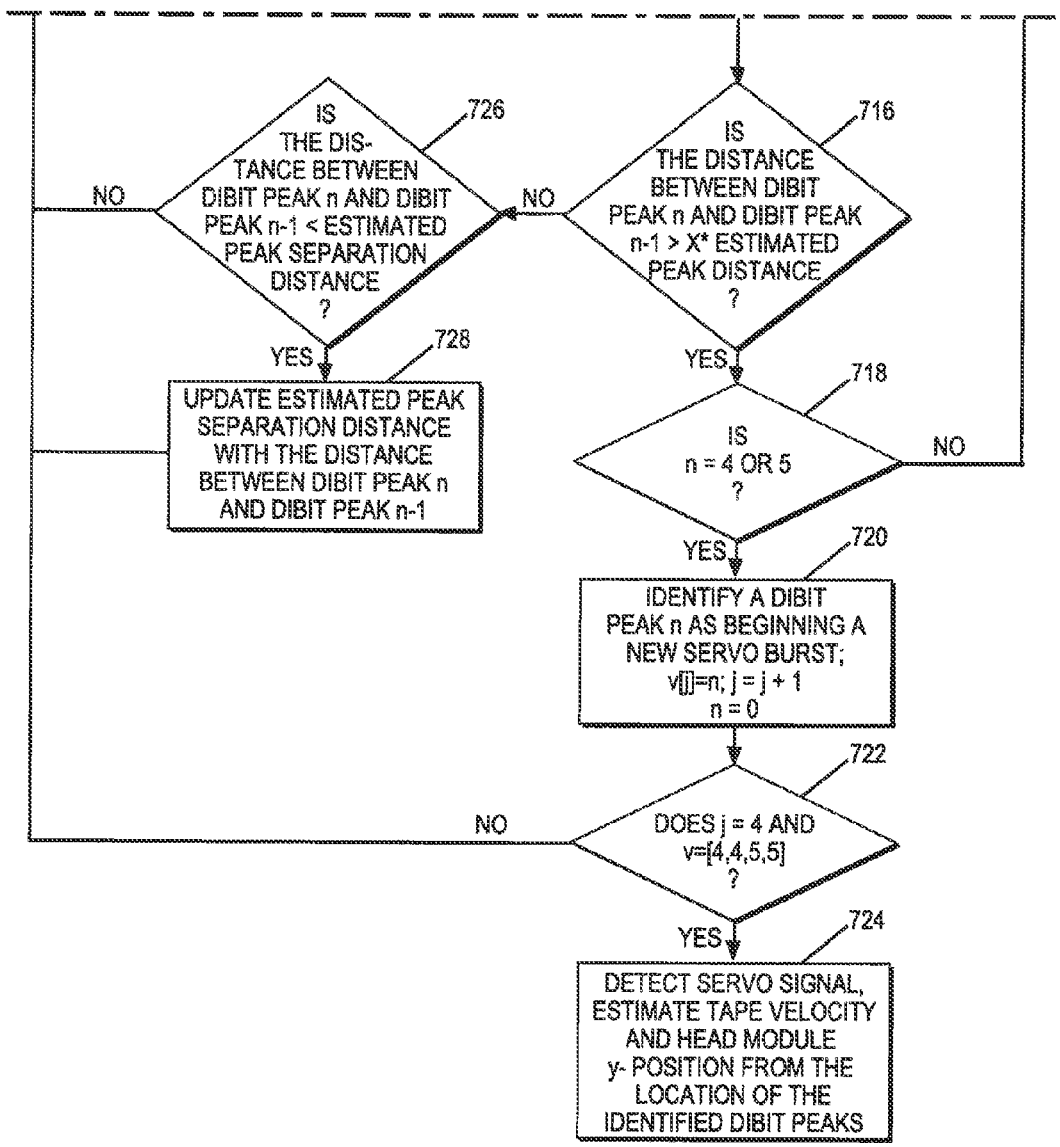
FIG. 7B is a flowchart summarizing Applicant's additional methods to detect servo bands and estimate certain servo-channel parameters.

FIGS. 7A and 7B summarizes Applicants' method to detect a servo frame, and estimate servo channel parameters, using Applicants' data element or servo element. By "Applicants' data element," Applicants mean a device disposed on a head module to read data from a sequential information storage medium, in addition to being capable of detecting servo frames encoded in a servo band encoded in the sequential information storage medium. By "servo element," Applicants mean a device disposed on a head module to detect servo frames encoded in a servo band encoded in the sequential information storage medium, as well as to very accurately and continuously estimate system parameters such as storage medium velocity, y-position of a head module, and LPOS information, for allowing reliable operation of a track-following servomechanism, but not capable of writing data to, and/or reading data from, the sequential information storage medium.

In summary, if a zero crossing has occurred, and if either a positive amplitude threshold or a negative amplitude threshold is met, the method identifies a peak and increments the peak counter (n). Further peaks will not be identified until a new zero crossing is observed. If a pre-determined number of positive peaks, or a pre-determined number of negative peaks, are identified in sequence, then the method increments the burst counter j. If a pre-determined number of bursts are identified in sequence, then the method declares the detection of a complete servo frame.

Referring now to FIG. 7A, in step 701 the method provides a servo signal sample counter (k), an identified peak counter (n), an identified burst counter (j), a positive amplitude threshold, a negative amplitude threshold, an estimated peak separation distance, a peak vector (v), and peak time vector (p).

In step 702, the method sets counters (k), (n), and (j) to zero, sets peak vector (v) and peak time vector (p) to zero, and resets a zero crossing flag to a first value. In certain embodiments, step 702 is performed by a controller, such as controller 220 (FIG. 2), disposed in a data storage device, such as data storage device 200 (FIG. 2). In certain embodiments, step 702 is performed by a data management program, such as data management program 244 (FIG. 2), disposed in a host computer, such as host computer 240 (FIG. 2).

In step 704, (k), acting as a counter for the number of samples acquired, is increased by unity and sample $r_k$ is acquired and inputted. In certain embodiments, sample $r_k$ is acquired by a servo element, such as servo elements 110 or 130. In certain embodiments, sample $r_k$ is acquired by a data element, such as data element 112 (FIGS. 1, 4, 5), wherein data element 112 can detect and recognize servo patterns as described in U.S. Pat. No. 6,940,682 which is owned by the common assignee hereof and wherein is hereby incorporated herein by reference.

In certain embodiments, step 704 is performed by a controller, such as controller 220 (FIG. 2), disposed in a data storage device, such as data storage device 200 (FIG. 2). In certain embodiments, step 704 is performed by a data management program, such as data management program 244 (FIG. 2), disposed in a host computer, such as host computer 240 (FIG. 2).

In step 706, the method determines if a zero crossing flag is set to a second value indicating that a zero crossing has occurred. In certain embodiments, step 706 is performed by a controller, such as controller 220 (FIG. 2), disposed in a data storage device, such as data storage device 200 (FIG. 2). In certain embodiments, step 706 is performed by a data management program, such as data management program 244 (FIG. 2), disposed in a host computer, such as host computer 240 (FIG. 2).

If the method determines in step 706 that a zero crossing flag is not set, then the method transitions from step 706 to step 708 wherein the method determines if the signs of samples $r_k$ and $r_{k-1}$ differ, i.e. if sample $r_k$ is positive and sample $r_{k-1}$ is negative or if sample $r_k$ is negative and sample $r_{k-1}$ is positive. In certain embodiments, step 708 is performed by a controller, such as controller 220 (FIG. 2), disposed in a data storage device, such as data storage device 200 (FIG. 2). In certain embodiments, step 708 is performed by a data management program, such as data management program 244 (FIG. 2), disposed in a host computer, such as host computer 240 (FIG. 2).

If the method determines that the signs of samples $r_k$ and $r_{k-1}$ do not differ, then the method transitions from step 708 to step 704 and continues as described herein.

If the method determines that the signs of samples $r_k$ and $r_{k-1}$ do differ, a zero crossing has occurred and the method transitions from step 708 to step 710, wherein the method sets a zero crossing flag to a second value. In certain embodiments, step 710 is performed by a controller, such as controller 220 (FIG. 2), disposed in a data storage device, such as data storage device 200 (FIG. 2). In certain embodiments, step 710 is performed by a data management program, such as data management program 244 (FIG. 2), disposed in a host computer, such as host computer 240 (FIG. 2).

In the illustrated embodiment of FIG. 7A, when the sign of samples $r_k$ and $r_{k-1}$ differ, a flag is set in step 710 (FIG. 7A) indicating that a zero crossing has occurred. In step 712 the method determines if the amplitude of sample $r_k$ exceeds a predetermined threshold. In certain embodiments, step 712 is performed by a controller, such as controller 220 (FIG. 2), disposed in a data storage device, such as data storage device 200 (FIG. 2). In certain embodiments, step 712 is performed by a data management program, such as data management program 244 (FIG. 2), disposed in a host computer, such as host computer 240 (FIG. 2).

If the method determines in step 712 that the amplitude of sample $r_k$ exceeds a predetermined threshold, then the method transitions from step 712 to step 714 wherein the method identifies sample $r_k$ as a dibit peak. Further in step 714, the method increments the peak counter, i.e. sets (n) equal to (n+1), and updates peak time vector p with counter value k for peak location n of servo burst j p[n,j]. Further in step 714, the method resets the zero crossing flag to the first value.

In certain embodiments, step 714 is performed by a controller, such as controller 220 (FIG. 2), disposed in a data storage device, such as data storage device 200 (FIG. 2). In certain embodiments, step 714 is performed by a data management program, such as data management program 244 (FIG. 2), disposed in a host computer, such as host computer 240 (FIG. 2).

Turning again to FIG. 6, a positive amplitude threshold is illustrated by line 604 and a negative amplitude threshold by line 606. By way of example and not limitation, if a zero crossing was noted between times t−1 and t, and if the signs at the zero crossing went from negative to positive, then the servo signal is possibly progressing towards dibit peak 608. However, where, as in the illustrated embodiment of FIG. 6, the signal is distorted, the waveform may exhibit more than one signal peak within a dibit. One such signal peak is labeled as 610. Thus, the requirement that the amplitude of sample $r_k$ exceed a threshold, here indicated by line 604, prevents the signal peak at point 610 from being identified as a positive dibit peak. Furthermore, if both peaks 610 and 608 exceed the threshold 604, the requirement of detecting first a zero crossing followed by a threshold crossing prevents peak 608 from being detected as a new dibit peak, since no zero crossing has occurred between peaks 610 and 608.

Returning to FIG. 7B, in step 716 the method determines if the distance between a (n)th dibit peak and a (n−1)th dibit peak is greater than a multiplication product of a factor of X (typically X=1.5) and the estimated peak separation distance of step 728. In certain embodiments, step 716 is performed by a controller, such as controller 220 (FIG. 2), disposed in a data storage device, such as data storage device 200 (FIG. 2). In certain embodiments, step 716 is performed by a data management program, such as data management program 244 (FIG. 2), disposed in a host computer, such as host computer 240 (FIG. 2).

If the method determines in step 716 that the distance between a (n)th dibit peak and a (n−1)th dibit peak is not greater than a multiplication product of a factor of X (typically X=1.5) and the estimated peak separation distance of step 702, the method transitions from step 716 to step 726 and determines that the (n)th dibit peak and the (n−1)th dibit peak are within the same servo burst.

In step 726, the method determines if the distance between a (n)th dibit peak and a (n−1)th dibit peak is less then the previously saved estimated peak separation distance. In certain embodiments, step 726 is performed by a controller, such as controller 220 (FIG. 2), disposed in a data storage device, such as data storage device 200 (FIG. 2). In certain embodiments, step 726 is performed by a data management program, such as data management program 244 (FIG. 2), disposed in a host computer, such as host computer 240 (FIG. 2).

If the method determines in step 726 that the distance between a (n)th dibit peak and a (n−1)th dibit peak is not less then the estimated separation distance between dibit peaks, then the method transitions from step 726 to step 704 and continues as described herein. Alternatively, if the method in step 726 determines that the distance between a (n)th dibit peak and a (n−1)th dibit peak is less then the estimated peak separation distance, then the method transitions from step 726 to step 728 and revises and saves that revised estimated peak separation distance.

In certain embodiments, step 728 is performed by a controller, such as controller 220 (FIG. 2), disposed in a data storage device, such as data storage device 200 (FIG. 2). In certain embodiments, step 728 is performed by a data management program, such as data management program 244 (FIG. 2), disposed in a host computer, such as host computer 240 (FIG. 2). The method transitions from step 728 to step 704 and continues as described herein.

If the method determines in step 716 that the distance between the (n)th dibit peak and the (n−1)th dibit peak is greater than the multiplication product of factor X and the estimated peak separation distance, the method transitions from step 716 to step 718 wherein the method determines if the peak counter (n) is equal to either 4 or 5. In certain embodiments, step 718 is performed by a controller, such as controller 220 (FIG. 2), disposed in a data storage device, such as data storage device 200 (FIG. 2). In certain embodiments, step 718 is performed by a data management program, such as data management program 244 (FIG. 2), disposed in a host computer, such as host computer 240 (FIG. 2).

A servo signal, which is obtained by reading servo frame 300 (FIG. 3) by a servo element or a data element, comprises of burst sequences of [5, 5, 4, 4] dibits, each comprising at least one positive and one negative peak. In such an embodiment a valid number for (n) is 4 or 5. Other servo patterns may comprise a different sequence of dibits. In such embodiments, step 718 is revised to recite a valid number of dibits within bursts.

If (n) is not 4 or 5, or another valid number of pulses, then a valid servo burst has not been observed and the method transitions from step 718 to step 702 and continues as described herein.

If the method determines that (n) is a valid number, the (n)th dibit peak is the first dibit peak in a new servo burst. In step 720 the method updates the peak vector v with peak counter n at vector location v[j], increments burst counter j by unity, i.e. sets j=j+1, and the peak counter n is reset to 0.

In step 722, the method determines if j equals four (4) and the peak vector v contains a valid burst sequence such as [4, 4, 5, 5]. In certain embodiments, step 722 is performed by a controller, such as controller 220 (FIG. 2), disposed in a data storage device, such as data storage device 200 (FIG. 2). In certain embodiments, step 722 is performed by a data management program, such as data management program 244 (FIG. 2), disposed in a host computer, such as host computer 240 (FIG. 2).

If the method determines in step 722 that j does not equal 4 or the peak vector v does not contain a valid burst sequence such as [4, 4, 5, 5], then the method transitions from step 722 to step 704 and continues as described herein. Alternatively, if the method determines in step 722 that j equals 4 and the peak vector v contains a valid burst sequence such as [4, 4, 5, 5], then the method transitions from step 722 to step 724 wherein the method determines that a full servo frame has been detected. In certain embodiments, the velocity of the sequential information storage medium as well as the y-position of the head module can be estimated using the content of peak time vector p.

FIG. 7A was described in terms of identifying positive dibit peaks, the method equally applies to detecting negative dibit peaks. In such an embodiment, at step 708, the sign of sample $r_k$ would be negative while the sign of sample $r_{k-1}$ would be positive.

Using the method of FIGS. 7A and 7B, Applicants' method can reliably detect and identify the presence of the servo signal using either servo elements or data elements. This process further allows the position of the head module relative to the servo band to be continuously estimated, even where the lateral velocity of the sequential information storage medium is nonzero, by identifying the servo or data element detecting the servo signal. The detection of the servo signal with a data element or a servo element allows the rapid positioning of the servo elements over the servo bands in a manner which solves the moving-target problem previously described in connection with FIG. 5. The servo-channel parameter estimates can be used to precisely position the head element on its target location once at least one servo element is aligned with at least one servo band. If both sets of positive and negative dibit peaks are available and the peak vectors v for positive and negative dibit peaks contain valid burst sequences such as [4, 4, 5, 5], the servo-channel parameter estimates can be derived utilizing the contents of positive and negative peak time vectors p.

Figure 8B:
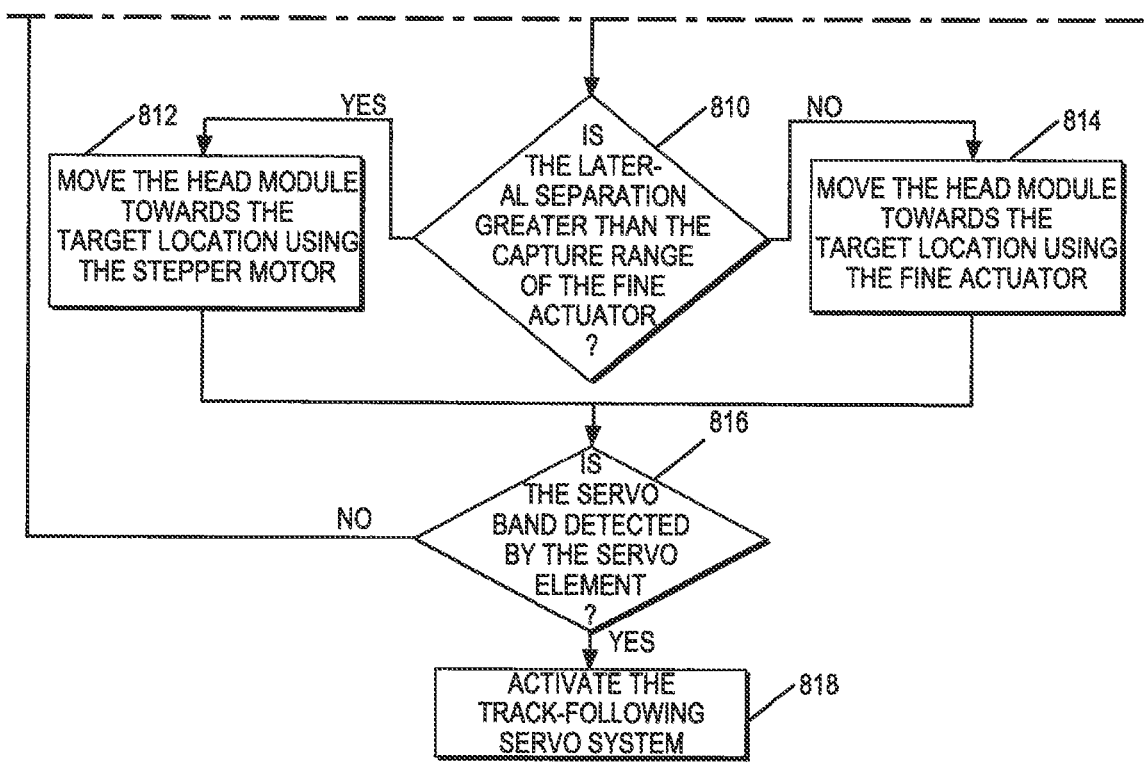
FIG. 8B is a flowchart summarizing Applicants' additional methods to use the methods of FIGS. 7A and 7B to rapidly position a head module.

FIGS. 8A and 8B is a flowchart summarizing the steps of Applicants' method to rapidly position a head module using the method described herein above and in FIGS. 7A and 7B. Referring now to FIG. 8A, in step 802 the method provides a head module, such as head module 210 (FIGS. 1, 2, 4 and 5), comprising a servo element, such as servo element 110 (FIG. 1) and/or 130 (FIG. 1), and a plurality of data elements, such as data elements 120 (FIG. 1), where both the servo element and the data elements can detect servo patterns.

In step 804, the method moves a sequential information storage medium, such as sequential information storage medium 402 (FIGS. 2, 4, and 5), comprising a servo band, such as servo band 404 or 406 (FIG. 4), across the head module. In certain embodiments, step 804 is performed by a controller, such as controller 220, disposed in a data storage apparatus comprising head module of step 802, such as data storage apparatus 200. In certain embodiments, step 804 is performed by a host computer, such as host computer 240 (FIG. 2), in communication with the head module of step 802.

In step 805, the method moves the head module 210 upwardly or downwardly using a stepper motor to find a servo band. In certain embodiments, step 805 is performed by a controller, such as controller 220, disposed in a data storage apparatus comprising head module of step 802, such as data storage apparatus 200. In certain embodiments, step 805 is performed by a host computer, such as host computer 240 (FIG. 2), in communication with the head module of step 802.

In step 806, one of the plurality of data or servo elements of step 802, such as one of data elements 120 or servo elements 110, 130, detects a servo band, such as servo band 404 or 406. Step 806 includes one or more of the steps shown in FIG. 7A and described hereinabove.

In step 808, the method estimates a lateral separation between the detected servo band and a servo element by identifying the detecting data or servo element. In certain embodiments, step 808 is performed by a controller, such as controller 220, disposed in a data storage apparatus comprising head module of step 802, such as data storage apparatus 200. In certain embodiments, step 808 is performed by a host computer, such as host computer 240 (FIG. 2), in communication with the head module of step 802.

In step 810, the method determines if the estimated lateral separation of step 808 is greater than a capture range of the fine actuator of step 802. In certain embodiments, step 808 is performed by a controller, such as controller 220, disposed in a data storage apparatus comprising head module of step 802, such as data storage apparatus 200. In certain embodiments, step 808 is performed by a host computer, such as host computer 240 (FIG. 2), in communication with the head module of step 802.

If the method determines that the estimated lateral separation of step 808 is greater than a capture range of the fine actuator of step 802, then the method transitions to step 812 and moves the head module toward a target location, i.e. a location where the servo element can detect the servo band, using the stepper motor of step 802. In certain embodiments, step 812 is performed by a controller, such as controller 220, disposed in a data storage apparatus comprising head module of step 802, such as data storage apparatus 200. In certain embodiments, step 812 is performed by a host computer, such as host computer 240 (FIG. 2), in communication with the head module of step 802. The method transitions from step 812 to step 816.

Alternatively, if the method determines in step 810 that the estimated lateral separation of step 808 is not greater than a capture range of the fine actuator of step 802, then the method transitions to step 814 wherein the method moves the head module of step 802 using the fine actuator of step 802. The method transitions from step 814 to step 816.

In certain embodiments, the method moves the head module in step 814 using a feedforward operation. By "feedforward operation," Applicants mean a control signal is computed and applied to the fine actuator to let the head module travel over the estimated lateral separation in a given time interval, and land over the servo band without overshoot. Because the various operating parameters are pre-defined, those operating parameters need not be determined or calculated for every move operation, and therefore, Applicants' method can more rapidly respond to changing lateral positions of the sequential storage medium.

Applicants' fine actuator can move the head module faster than the coarse actuator, and is generally, but not always, faster than the lateral velocity of the sequential information storage medium. By way of example and not limitation, a worst-case maximum lateral velocity of the sequential information storage medium may be about 0.05 m/s whereas the velocity of the actuator during coarse positioning by the stepper motor is about 0.02 m/s. Thus, for rapid positioning, it is preferable to use the fine actuator as soon as a target position is within the capture range of the fine actuator. In certain embodiments, the capture range of the fine actuator is +/−750 µm.

In step 816 the method determines if the servo element is now able to detect a servo band. In certain embodiments, step 816 is performed by a controller, such as controller 220, disposed in a data storage apparatus comprising head module of step 802, such as data storage apparatus 200. In certain embodiments, step 816 is performed by a host computer, such as host computer 240 (FIG. 2), in communication with the head module of step 802.

If the method determines in step 816 that the servo element is now able to detect a servo band, then the method transitions from step 816 to step 818 wherein the method activates a track-following servo system. Alternatively, if the method determines in step 816 that the servo element is not able to detect a servo band, then the method transitions from step 816 to step 805 and continues as described herein.

In certain embodiments, individual steps recited in FIGS. 7 and/or 8 may be combined, eliminated, or reordered.

In certain embodiments, only a subset of the signals provided by the (N) data elements, e.g., two for an LTO drive with sixteen data elements, may be monitored in a multiplexed manner to determine the position of the servo band relative to the head module, thus significantly reducing implementation complexity.

In certain embodiments, computer program readable code, such as computer program readable code 232 (FIG. 2) and/or computer program readable code 246, is encoded in a computer readable medium, such as computer readable medium 230 (FIG. 2) and/or computer readable medium 248 (FIG. 3), wherein that computer program readable code is implemented by a processor, such as processor 222 (FIG. 2) and/or processor 242, to perform one or more of the steps 802, 804, 805, 806, 808, 810, 812, 814, 816, and/or 818 recited in FIGS. 8A and 8B.

In yet other embodiments, the invention includes instructions residing in any other computer program product, where those instructions are implemented by a computer external to, or internal to, data storage apparatus 200 (FIG. 2), to perform one or more of the blocks 802, 804, 805, 806, 808, 810, 812, 814, 816, and/or 818 recited in FIGS. 8A and 8B. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

While the preferred embodiments of the present invention have been illustrated in detail, it should be apparent that modifications and adaptations to those embodiments may occur to one skilled in the art without departing from the scope of the present inventions.

What is claimed is:

1. A data storage device, comprising a non-transitory computer readable medium comprising computer readable program code disposed therein to position a head module comprising at least one servo element and a plurality of data elements, wherein at least one servo element and each of the plurality of data elements can detect a servo band comprising a plurality of servo frames encoded in a sequential information storage medium, wherein each of said plurality of servo frames comprises a plurality of servo bursts, each servo burst comprising a given number of stripes in a defined configuration, wherein each stripe, whenever being read by a servo element or a data element, generates a servo signal that comprises a first signal peak comprising a first sign and a second signal peak comprising a second sign, wherein the first sign and the second sign differ, the computer readable program code comprising a series of computer readable program steps to effect:

identifying only signal peaks having a selected sign, wherein said selected sign is either a positive sign or a negative sign; and detecting a servo pattern and generating a servo signal upon identification of a sequence of [4, 4, 5, 5] signal peaks having said selected sign.

2. The data storage device of claim 1, wherein said computer readable program code further comprises a series of computer readable program steps to effect detecting a servo pattern and generating a servo signal when:

a zero crossing has occurred;

a negative amplitude threshold is met; and a pre-determined number of negative peaks in sequence are identified.

3. The data storage device of claim 2, wherein said computer readable program code further comprises a series of computer readable program steps to effect identifying a servo band if a sequence of signal peaks detected by at least one servo element or any one of the plurality of data elements matches a servo frame architecture.

4. The data storage device of claim 3, wherein said computer readable program code further comprises a series of computer readable program steps to effect estimating a lateral separation between the identified servo band and a servo element based on a location of the data or servo element detecting said sequence of signal peaks.

5. The data storage device of claim 4, wherein said computer readable program code further comprises a series of computer readable program steps to effect moving the head module by the lateral separation to position a servo element to detect the identified servo band.

6. The data storage device of claim 2, wherein said computer readable program code further comprises a series of computer readable program steps to effect estimating a velocity of the sequential information storage medium and a lateral position of the head module based on time intervals between detected signal peaks by at least one servo element or any one of the plurality of data elements.

7. A data storage device, comprising:

a head module comprising at least one servo element;

a plurality of data elements;

wherein:

at least one servo element and each of the plurality of data elements can detect a servo band comprising a plurality of servo frames encoded in a sequential information storage medium;

each of said plurality of servo frames comprises a plurality of servo bursts, each servo burst comprising a given number of stripes in a defined configuration;

each stripe, whenever being read by a servo element or a data element, generates a servo signal that comprises a first signal peak comprising a first sign and a second signal peak comprising a second sign, wherein the first sign and the second sign differ;

said data storage device is configured to:

identify only signal peaks having a selected sign, wherein said selected sign is either a positive sign or a negative sign; and detect a servo pattern and generating a servo signal upon identification of a sequence of [4, 4, 5, 5] signal peaks having said selected sign.

8. The data storage device of claim 7, further configured to detect a servo pattern and generating a servo signal when:

a zero crossing has occurred;

a negative amplitude threshold is met; and a pre-determined number of negative peaks in sequence are identified.

9. The data storage device of claim 8, further configured to identify a servo band if a sequence of signal peaks detected by at least one servo element or any one of the plurality of data elements matches a servo frame architecture.

10. The data storage device of claim 9, further configured to estimate a velocity of the sequential information storage medium and a lateral position of the head module based on time intervals between detected signal peaks by at least one servo element or any one of the plurality of data elements.

11. The article of manufacture of claim 10, further configured to estimate a lateral separation between the identified servo band and a servo element based on a location of the data or servo element detecting said sequence of signal peaks.

12. The article of manufacture of claim 11, further configured to move the head module by the lateral separation to position a servo element to detect the identified servo band.

* * * * *